Figure 1:
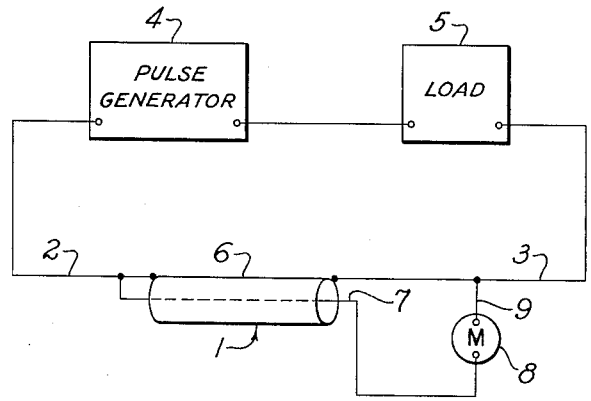

April 7, 1953   Q. A. KERNS   2,634,307
HIGH-FREQUENCY SHUNT
Filed March 7, 1950

INVENTOR.
QUENTIN A. KERNS
BY
Roland A. Anderson
ATTORNEY.

Patented Apr. 7, 1953

2,634,307

UNITED STATES PATENT OFFICE 2,634,307

HIGH-FREQUENCY SHUNT

Quentin A. Kerns, Berkeley, Calif., assignor to the United States of America as represented by the United States Atomic Energy Commission Application March 7, 1950, Serial No. 148,176

3 Claims. (Cl. 171—95)

The present invention relates generally to shunts employed in electrical measurements and is particularly concerned with high frequency shunts or current viewing resistors as they are sometimes called.

The determination of the shape and characteristics of high frequency pulses, or pulses having a rapid rise time, is commonly accomplished by means of an oscilloscope having the pulse or some fraction thereof impressed upon one set of deflection plates and a synchronous sawtooth voltage impressed upon the other set of deflection plates. The pulse voltage for the oscilloscope conventionally comprises a voltage developed across a shunt or current viewing resistor inserted in series in the pulse circuit. In high frequency measurements it is necessary to prevent or compensate for variations in the shunt voltage with frequency variations. Reactive components in the shunt impedance produce voltages which vary with frequency and thus it would be desirable to employ a pure resistive element as the shunt. So-called non-inductive resistors are commonly employed in this respect; however, such resistors at most minimize inductive reactance and do not eliminate it. For the measurement of pulse shapes having a rapid rise time there has recently been developed a coaxial resistor in which the current in the center conductor is of the opposite polarity to the current in the outer conductor whereby the inductive fields established are in opposite directions. Although this method of reducing the inductance of the resistor is satisfactory for particular applications, difficulty is still encountered where very high frequencies are concerned or very precise measurements are required owing to the fact that the opposing fields do not entirely cancel each other out and the inductive potential becomes appreciable under the above noted circumstances.

It will be appreciated that in order to accurately measure high frequency current pulses, having either constant or varying interpulse intervals, the input signal to the meter must be independent of frequency and that in order to fulfill this requirement reactive voltages must be eliminated from the meter circuit.

Accordingly, it is an object of the present invention to provide a method and means of producing a voltage which is proportional to a high frequency pulse and independent of the frequency thereof.

Another object of the present invention is to provide a high frequency shunt having a substantially zero resultant reactive voltage.

A further object of the present invention is to provide a high frequency shunt for a meter wherein the inductive voltage between meter leads is substantially zero.

It is still another object of the present invention to provide a high frequency shunt for producing a voltage signal directly proportional to a current pulse having a rapid rise time regardless of the rapidity of the rise time.

A still further object of the present invention is to provide a high frequency shunt producing a voltage signal independent of the frequency of the current pulse impressed thereon.

Figure 2:
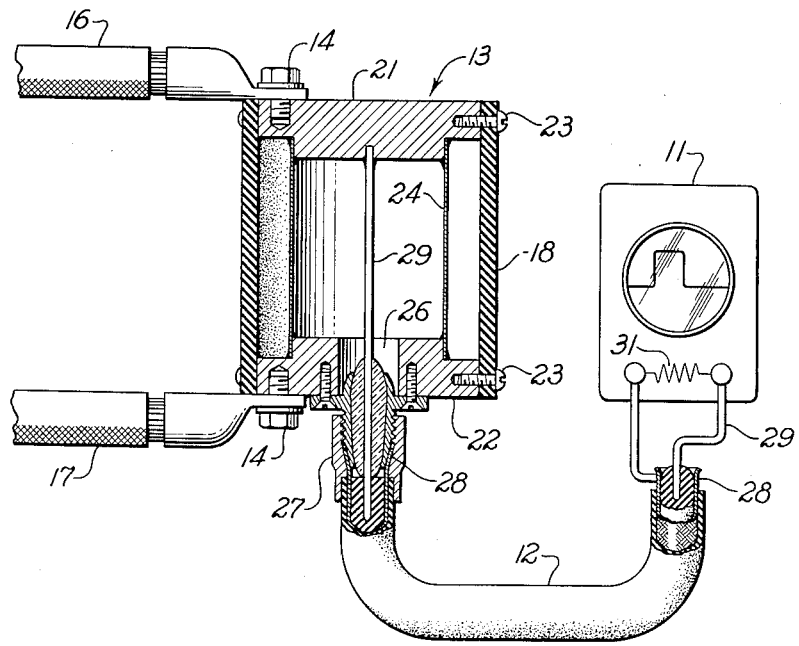

Further objects and advantages of the invention will become apparent from the following description and claims taken together with the appended drawings wherein Figure 1 is a schematic representation of the invention and Fig. 2 is a detailed sectional illustration of one embodiment of the invention.

Considering the invention in general and referring to Fig. 1, it may be noted that the shunt I is inserted in series with conductors 2 and 3 of a pulse circuit including a pulse generator 4 and load 5. The shunt I includes a resistive element 6 of generally cylindrical configuration connected between conductors 2 and 3, and an instrument lead 7 connected to conductor 2 and passing through the resistive element 6 in coaxial relation thereto. A meter 8 is connected to instrument lead 7 and to conductor 3 by another lead 9 and is thereby isolated from inductive potentials induced in shunt I, as explained below.

It will be appreciated that a current pulse in the pulse circuit which passes through the resistive element will produce a resistive and a reactive voltage drop in the resistive element 6. In this invention the inductance of the resistance element 6 is minimized by employing a relatively large diameter therefor and in a typical construction its inductance may be less than .01 microhenry. The current flowing in the meter circuit including lead 7 is extremely minute compared to the current in the pulse circuit and for all practical purposes may be disregarded in considering the shunt voltage. The inductive field produced by current flow through resistive element 6 links the lead 7 coaxial therewith to the same extent that it links resistive element 6. Thus, equal voltages are induced in resistive element 6 and lead 7 coaxial therewith and furthermore these voltages have the same polarity, i. e., if the right side of resistive element 6 is positive for the inductive voltage therein, the right side of the lead 7 is positive for the voltage induced therein. It will be seen from the above that the resultant inductive voltage between wires 3 and 7 is zero, and it is between these wires that the meter 8 is connected, and thereby isolated from the undesirable inductive voltage of the shunt.

With reference to the structure and composition of one embodiment of the invention, reference is made to Fig. 2 wherein an oscilloscope 11 is shown connected by means of a coaxial cable 12 to the shunt 13 which is in turn connected, by any suitable means such as lugs 14, in series between conductors 16 and 17 of a pulse circuit (not shown). The shunt 13 comprises a generally cylindrical insulator 18 having end plates 21 and 22. The end plates are formed of any suitable conducting material, such as brass, and are secured to the insulating cylinder 18 by means of screws 23 passing through insulator 18 and threaded into the periphery of the end plates. A concentric shoulder is formed about each of the end plates 21 and 22 on the face thereof directed toward the interior of the insulating cylinder 18, and a thin walled generally cylindrical element 24 comprising the resistive element of the shunt engages these shoulders of the end plates. The thin walled cylinder 24, or resistance cylinder as it is hereinafter termed, abuts both end plates 21 and 22 and the inner surface thereof bears upon the shoulders on the end plates; suitable means, such as welding or brazing, is employed to secure the resistance cylinder 24 in fixed relation to the end plates and to insure fluid tight contact therebetween in the circumstance where such is required, as disclosed below. As noted above, the resistance cylinder 24 has thin walls which thereby reduce the variation of resistance with frequency and also the diameter of cylinder 24 is maintained relatively large in order to reduce the inductance thereof. Resistance cylinder 24 may be formed of any nonmagnetic conducting material which will provide the desired resistance in the required thickness and length. For example the cylinder may have a diameter of one inch and a length of two inches with a nichrome wall approximately .01 inch thick; however, it should be noted that the particular dimensions and material employed is dependent upon the size shunt required for each particular application.

One of the end plates 22 has a centrally located transverse opening 26 therethrough and a standard coaxial cable fitting 27 is secured to the end plate about this opening. Coaxial cable 12 is secured to the standard fitting 27 with the sheath 28 of the cable being electrically connected to the end plate 22 and the central lead 29 of the cable extending through the opening 26. Central lead 29 of the coaxial cable 12 is disposed along the axis of the resistance cylinder 24 and is secured by any suitable means to the end plate 21 whereby its position with respect to resistance cylinder 24 is fixed. The two conductors of the coaxial cable are connected to the terminals of the vertical deflecting plates or coils of an oscilloscope 11 and a matching resistor 31 may be connected between the oscilloscope terminals to prevent reflection of a wave due to a mismatch at the oscilloscope..

Considering the operation of the above described embodiment of the invention, it will be noted that resistance cylinder 24 is connected in series with the pulse circuit through conductors 16 and 17 and end plates 21 and 22. Thus a current pulse in the pulse circuit also passes through the resistance cylinder 24 and as noted above this current pulse produces a resistive voltage drop and an inductive voltage drop across the resistance cylinder 24. The inductive voltage drop in the resistance cylinder 24 also induces an equal inductive voltage in center conductor 29 of coaxial cable 12 which lies in part along the axis of resistance cylinder 24. As the oscilloscope 11 is connected by means of coaxial cable 12 between the conductors 16 and 17 of the pulse circuit, it will be appreciated that the inductive voltage of the shunt is canceled out and the oscilloscope is effectively influenced only by the resistive voltage drop across the shunt. In this respect reference is made to the above discussion of the schematic representation of Fig. 1 wherein this cancellation is more fully treated. In order to depict the wave shape of the current pulse as a trace on the oscilloscope screen the horizontal deflecting plates or coils of the oscilloscope are connected to a sawtooth voltage generator (not shown) which is synchronized with the current pulses.

It is to be further noted that in order for the voltage induced in lead 29 to be equal to that induced in resistance cylinder 24, it is necessary for the lead 29 to be located at the center of flux density of resistance cylinder 24. It is thus important for the current flow to be uniformly distributed around the resistance cylinder and to obtain this condition the pulse circuit conductors should contact the shunt in the approximate center of the diameter thereof rather than as shown in the drawing for convenience of illustration. For particular applications it may be advantageous to proceed even further in insuring a complete cancellation of the inductive voltage in the shunt and this may be accomplished by providing adjustable means to displace the central conductor of the coaxial cable from the axis of the resistance cylinder and by appropriate measurements the precise position of the conductor for complete cancellation of the inductive voltage may then be established for the particular shunt in question.

One further adjunct of the invention comprises means to circulate a cooling medium, such as oil, about the resistance cylinder in order to prevent overheating and distortion thereof when large current pulses having a high repetition rate are to be measured. The resistance cylinder may be joined to the end plates in fluid-tight relation, as noted above, and the insulating cylinder may be joined in fluid-tight relation to the end plates by means of gaskets or other suitable means to define a coolant chamber about resistance cylinder 24. A coolant may then be circulated through this chamber by appropriate means including inlet and outlet pipes entering, for example, through the insulating cylinder wall.

From the foregoing it is believed apparent that the present invention provides a high frequency shunt capable of effectively isolating a meter connected thereto from inductive voltages produced therein and thereby providing a voltage signal independent of frequency variations.

While the invention has been disclosed with reference to one particular embodiment, it will be appreciated that numerous modifications and variations are possible within the spirit and scope of the invention and therefore the invention is not to be limited except as defined in the following claims.

What is claimed is:

1. A high frequency shunt comprising a hollow cylindrical insulator, a pair of electrically conducting end plates secured to said insulator in closing relation thereto, a thin-walled hollow cylindrical resistor within said insulator and abutting said end plates, each of said end plates having identical aligned bosses on the mutually presented faces thereof contacting said resistor and maintaining same in spaced axial alignment with said insulator, and an instrument lead disposed along the axis of said cylindrical resistor, said instrument lead being secured to one of said end plates and extending through the other of said end plates in insulated relation thereto, thereby providing with the end plate which is insulated from the instrument lead a pair of terminals across which a potential indicating meter may be connected.

2. Means for determining the value of the current in a pulse circuit comprising an envelope adapted to be connected in series in said circuit by the ends thereof and including a pair of electrically conductive end plates and a hollow insulating cylinder maintaining said end plates in spaced relation, a thin-walled hollow cylindrical resistor interior to said envelope and abutting said end plates about the periphery of each end of said resistor, a potential indicating meter, a coaxial cable having a central conductor and a conducting sheath both connected at one end to said meter, the sheath of said cable being connected to one of said end plates, and the central conductor of said cable extending through said connected end plate in insulated relation thereto and being connected to the other of said end plates, said central conductor being disposed along the axis of said cylindrical resistance whereby the summation of the inductive voltages of said shunt which is impressed upon said meter is substantially zero.

3. A high frequency shunt comprising a first cylinder formed of electrically non-conducting material, a pair of electrically conducting end plates disposed one at each end of said first cylinder in closing relation thereto and rigidly secured to said cylinder, said end plates having identical circular bosses on the mutually presented faces thereof and said bosses being in mutual alignment at a distance from the edges of said plates, a thin walled electrically conducting second cylinder disposed within said first cylinder and coaxial therewith, said second cylinder engaging the bosses on said end plates and being secured thereto thereby maintaining the relative spaced-apart disposition of said first and second cylinders, and an electrical conductor disposed along the axes of said first and second cylinders, said conductor being secured to one of said end plates and the other end plate having a central aperture therein through which said conductor extends to form with said apertured end plate meter terminals of said shunt.

QUENTIN A. KERNS.

REFERENCES CITED

The following references are of record in the file of this patent:

UNITED STATES PATENTS

| Number | Name | Date |
| --- | --- | --- |
| 2,281,247 | Peterson | Apr. 28, 1942 |
| 2,366,991 | Wich | Jan. 9, 1945 |
| 2,416,981 | Crosby | Mar. 4, 1947 |
| 2,438,915 | Hansen | Apr. 6, 1948 |
| 2,502,657 | Lindenbald | Apr. 4, 1950 |
| 2,552,981 | Lamb | May 15, 1951 |